United States Patent
Rowley et al.

(10) Patent No.: US 9,156,514 B2
(45) Date of Patent: Oct. 13, 2015

(54) ADJUSTMENT DEVICE FOR ADJUSTING THE POSITION OF A WINDSCREEN

(71) Applicant: Bayerische Motoren Werke Aktiengesellschaft, Munich (DE)

(72) Inventors: Ian Rowley, Niedereschach (DE); Mathias Muehlmann, Olching (DE); Jochen Schanz, Niedereschach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/580,745

(22) Filed: Dec. 23, 2014

(65) Prior Publication Data

US 2015/0108783 A1 Apr. 23, 2015

Related U.S. Application Data

(63) Continuation of application No. PCT/EP2013/006095, filed on May 29, 2013.

(30) Foreign Application Priority Data

Jun. 28, 2012 (DE) .......................... 10 2012 211 182

(51) Int. Cl.
  *B62J 17/04* (2006.01)
(52) U.S. Cl.
  CPC ........................................ *B62J 17/04* (2013.01)
(58) Field of Classification Search
  CPC ....................................................... B62J 17/04
  USPC .................................................. 296/78.1, 89
  See application file for complete search history.

(56) References Cited

U.S. PATENT DOCUMENTS

| 5,730,483 | A | 3/1998 | Greger |
| 6,293,606 | B1 * | 9/2001 | Jarosz et al. ................. 296/78.1 |
| 6,641,196 | B1 | 11/2003 | Hanagan |
| 7,552,960 | B2 * | 6/2009 | Yoshitake et al. ........... 296/78.1 |
| 2006/0028045 | A1 | 2/2006 | Furuhashi et al. |

(Continued)

FOREIGN PATENT DOCUMENTS

| DE | 39 41 875 A1 | 6/1991 |
| DE | 39 41 875 C2 | 6/1993 |
| DE | 44 18 954 A1 | 12/1995 |

(Continued)

OTHER PUBLICATIONS

International Search Report (PCT/ISA/210) dated Jul. 30, 2013 with English translation (eight pages).

(Continued)

*Primary Examiner* — Jason S Morrow
(74) *Attorney, Agent, or Firm* — Crowell & Moring LLP

(57) ABSTRACT

An adjustment device for adjusting a windscreen of a vehicle, in particular of a motorcycle, is provided. A windscreen holder is connectable to the windscreen. A carrier structure is fastenable on the vehicle. A slider crank is connected to the carrier structure in a pivotable manner about a first pivot axis and to the windscreen holder in a pivotable manner about a second pivot axis. A linear guide is provided, wherein the windscreen holder is guided by a pivot bearing arrangement in a linearly movable manner in a longitudinal direction of the linear guide and is pivotable about a third pivot axis. The first pivot axis, the second pivot axis and the third pivot axis are oriented parallel to one another.

18 Claims, 4 Drawing Sheets

(56) References Cited

U.S. PATENT DOCUMENTS

2014/0035319 A1* 2/2014 Kitagawa .................... 296/180.5
2014/0084619 A1* 3/2014 Willey ............................ 296/89

FOREIGN PATENT DOCUMENTS

| DE | 100 65 130 A1 | 7/2002 |
| EP | 1 752 367 A2 | 2/2007 |
| GB | 2 218 060 A | 11/1989 |
| JP | 2000-159172 A | 6/2000 |
| JP | 2000-159173 A | 6/2000 |
| JP | 2000-177668 A | 6/2000 |
| JP | 2002-160683 A | 6/2002 |

OTHER PUBLICATIONS

German Search Report dated Mar. 14, 2013 with partial English translation (10 pages).

* cited by examiner

ADJUSTMENT DEVICE FOR ADJUSTING THE POSITION OF A WINDSCREEN

CROSS REFERENCE TO RELATED APPLICATIONS

This application is a continuation of PCT International Application No. PCT/EP2013/061095, filed May 29, 2013, which claims priority under 35 U.S.C. §119 from German Patent Application No. 10 2012 211 182.4, filed Jun. 28, 2012, the entire disclosures of which are herein expressly incorporated by reference.

BACKGROUND AND SUMMARY OF THE INVENTION

The invention relates to an adjustment device for adjusting a windscreen for vehicles, particularly for motorcycles.

Such adjustment devices are known, for example, from German Patent Document DE 39 41 875 C2. For the adjustment of a windscreen of a motorcycle, this arrangement comprises guide rails which are oriented to be inclined in the longitudinal direction of the vehicle. Sliders, on which the windscreen is, in turn, pivotably held, move in the guide rails. As a result of the differently inclined guide rails, the windscreen can be adjusted in its height as well as in its inclination.

Because of the further development of the arrangement, the sliders of the arrangement tend to get stuck with respect to the guide rails, particularly in the event of an accumulation of dirt and other particles.

In contrast, from German Patent Document DE 44 18 954, a device is known for adjusting a windscreen, which comprises a plurality of guide links which are mutually connected in an articulated manner and which, while forming a four-link mechanism, on one side, are connected with the windscreen and, on the other side, with a vehicle structure. The device may comprise a motor-operated and self-locking drive for moving the windscreen.

It is therefore an object of the invention to provide an adjustment device which has a construction that is as simple and light as possible and is nevertheless reliable, and can be produced in a cost-effective manner. Simultaneously, the connecting device should be easy to operate for the driver, on the one hand, and should be easily lockable in different positions, on the other hand.

This and other objects are achieved by an adjustment device for adjusting a windscreen of a vehicle, particularly of a motorcycle, having a windscreen holder which is connectable to the windscreen, a carrier structure which is fastenable to the vehicle, a slider crank, in which case the slider crank is pivotable about a first pivot axis connected with the carrier structure and pivotable about a second pivot axis connected with the windscreen holder, and a linear guide, in which case the windscreen holder is guided by a pivot bearing arrangement in a linearly movable manner in a longitudinal direction by the linear guide and is pivotable about a third pivot axis. The first, second and third pivot axis are oriented parallel to one another.

The windscreen holder is therefore connected with the linear guide by way of the pivot bearing arrangement, so that the windscreen holder can be linearly moved in a first longitudinal direction or be displaced along the linear guide. Simultaneously, the pivot bearing arrangement is designed for additionally also pivotably connecting the windscreen holder with the linear guide. This means that the windscreen holder is displaceably and simultaneously pivotably disposed at the linear guide.

The pivot bearing arrangement may either be designed as a partial section of the windscreen holder or be fixedly connected with the latter as a separate element. In addition, the swivel bearing arrangement may include sliding elements for the linear movement.

By use of the described adjustment device, the windscreen can therefore be adapted for the wind and weather protection to a respective driver size or height adjustment of the seat bench. In other words, the described adjustment device combines, in a particularly advantageous manner, a linear guide with a multiarticular pivot arrangement and achieves a mobility of the adjustment device with only three pivot axes and a number of movable components that is as small as possible. In addition, a length compensation is achieved by way of the described linear guide, so that a secure and simple height and inclination adjustment of the windscreen becomes possible, which requires only a small number of components and is therefore distinguished by a lower weight and a simple assembly.

Corresponding to a further embodiment, the adjustment device, in addition, includes a rotary drive for the pivoting of the slider crank about at least the first and/or the second pivot axis. An actuating of the adjustment device takes place, for example, by providing a rotating movement of the rotary drive which causes the pivoting movement of the slider crank, whereby the windscreen connected with the windscreen holder can be moved into the desired position.

Furthermore, the rotary drive may preferably include at least one drive unit, a worm drive rotatably coupled with the drive unit and a gearwheel engaging in the worm gear and non-rotatably coupled with the slider crank.

In this case, the rotary drive is preferably further developed such that a rotating movement provided by the drive unit causes a rotating movement of the worm drive about an axis of rotation of the worm drive. The gearwheel, which is non-rotatably coupled with the slider crank, as a result of its engagement in the worm drive, is also caused to carry out a rotating movement. The gearwheel is also preferably arranged with an axis of rotation coaxial to the first or the second pivot axis, so that the rotating movement of the gearwheel causes a corresponding pivoting of the slider crank about the first and the second pivot axis, respectively.

Particularly advantageously, this further development of the rotary drive or of the entire adjustment device has the effect that the worm drive causes a self-locking of the entire adjustment device which, on the one hand, prevents an unintended adjusting of the windscreen from an adjusted defined position, as, for example, by wind forces during the drive of the vehicle. On the other hand, it becomes possible in a particularly simple manner to adjust the windscreen within the scope of an extent of a movement not only in the respective end positions but continuously in an arbitrary number of intermediate positions and to fix it therein. A separate locking device for the fixing will therefore not be necessary.

Corresponding to a particularly preferred embodiment, the drive unit includes a manually operable handwheel for manually providing the rotating movement of the drive unit. For example, the drive unit may therefore consist of the handwheel which is coaxially constructed on a common shaft with the worm drive. Naturally, other arrangements are also contemplated. In particular, one or more gear positions may be provided between the handwheel and the worm drive for influencing a transmission ratio. The manually operable handwheel permits a particularly fast and comfortable adjustment of the windscreen corresponding to a driver's preference and ergonomic conditions. In addition, weight and installation space advantages are obtained because further additional driving components as well as their energy supply are no longer required.

Furthermore, instead of the handwheel, a motor-driven and/or hydraulically operated drive unit can also be used for providing the rotating movement. However, the particularly simple and light construction of the handwheel embodiment cannot be achieved.

For example, the rotary drive is arranged in a bearing area of the pivotable connection of the slider crank and the carrier structure and/or in a bearing area of the pivotable connection of the subcrank with the windscreen holder. This has the advantage that the rotary drive is disposed or supported in a particularly simple and stable manner, particularly in the event of a manual operation. In principle, there is the risk that the user exercises a high pressure force on the rotary drive, for example, by additionally and at least partially supporting himself on the rotary drive, which could otherwise lead to damage to or to a failure of the rotary drive.

The described linear guide may, for example, have two guide rails essentially oriented in the longitudinal direction of the vehicle, and the windscreen holder, by way of one sliding block respectively of the pivot bearing arrangement, may be linearly movably coupled with one of the two or the several guide rails in a linearly movable as well as pivotable manner.

This means that therefore, in a condition installed in the vehicle, the guide rails point essentially in the driving direction of the vehicle and are arranged parallel to one another. Advantageously, despite their orientation, the guide rails may additionally have an inclination with respect to a horizontal plane. The degree of inclination depends, for example, on the type of vehicle used and may be selected correspondingly.

By means of the described sliding block of the pivot arrangement, the windscreen holder, guided on the guide rail, may slide along in its longitudinal direction and simultaneously be guided by it. Furthermore, as described above, the pivot bearing arrangement with the sliding block may be further developed such that, relative to the guide rail, the windscreen holder can be tilted or pivoted about the third pivot axis. As a result of the displaceability of the sliding block or of the pivot bearing arrangement, the third pivot axis can also be displaced correspondingly.

For example, the pivot bearing arrangement may have a sliding block designed as a ball joint. Thus, the sliding block may, for example, have an essentially spherical body, which is longitudinally slidably fitted onto the guide rail and may be received in a section of the windscreen holder encompassing the ball. The sliding block and the encompassing section together form the pivot bearing arrangement of the windscreen holder.

According to a further embodiment, the windscreen holder has two arm-shaped holding elements, each holding element reaching around a first end and an opposite second end, and one of the sliding blocks of the pivot bearing arrangement respectively being arranged at the first end. The respective holding element in the area of the second end is designed for the pivotable connecting with the slider crank.

Likewise, the windscreen holder may be designed in one piece, for example, by means of a connection of the two arm-shaped holding elements.

A windscreen arrangement for a vehicle is further disclosed which has a windscreen and an adjustment device, the adjustment device being constructed according to the given description and the windscreen holder being connected with the windscreen for adjusting the height and inclination of the windscreen.

In addition, a vehicle with a windscreen arrangement is described, in which the windscreen arrangement is designed according to the given description and the carrier structure is fastened to the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
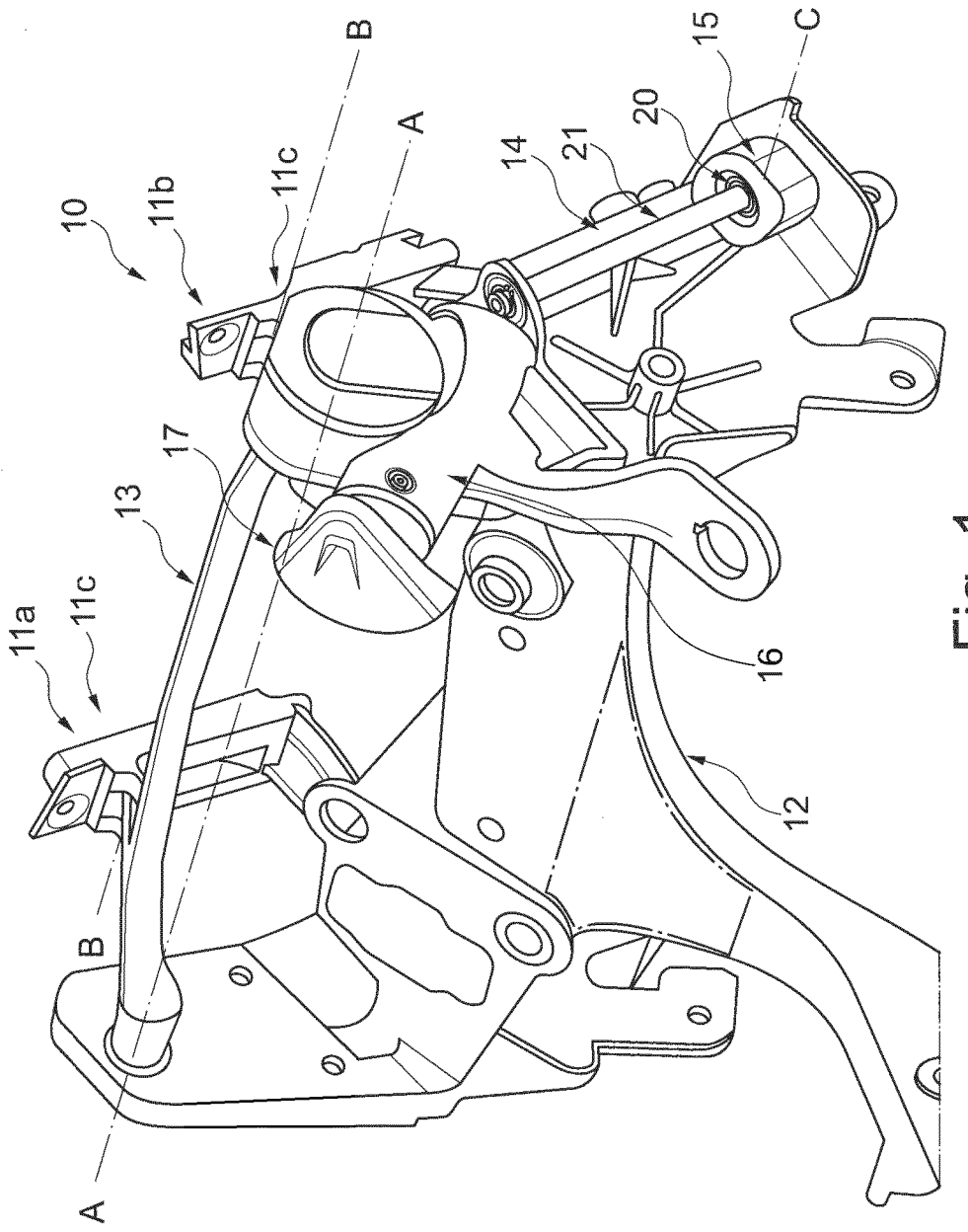
FIG. 1 is a first perspective view of an adjustment device according to an embodiment of the invention.
Figure 2:
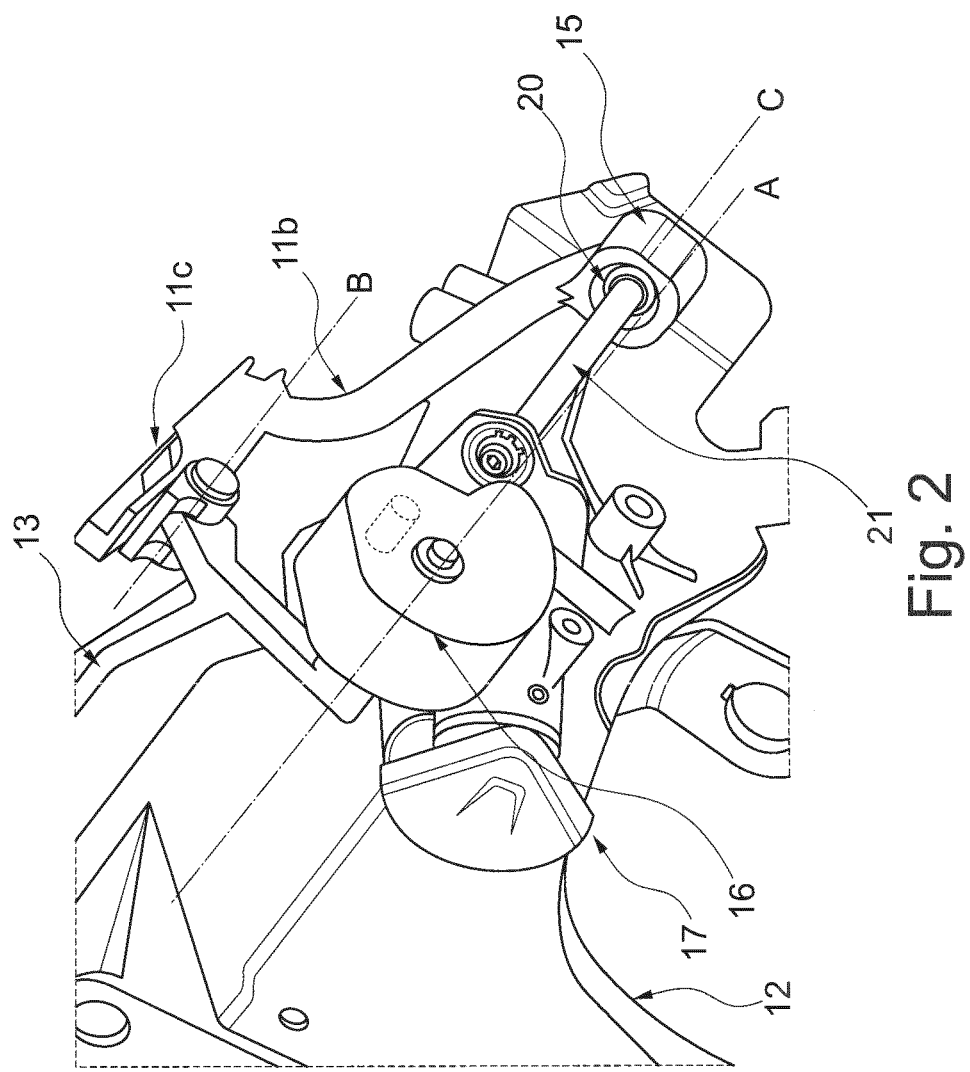
FIG. 2 is a second, detailed, perspective view of the adjustment device according to FIG. 1.
Figure 3:
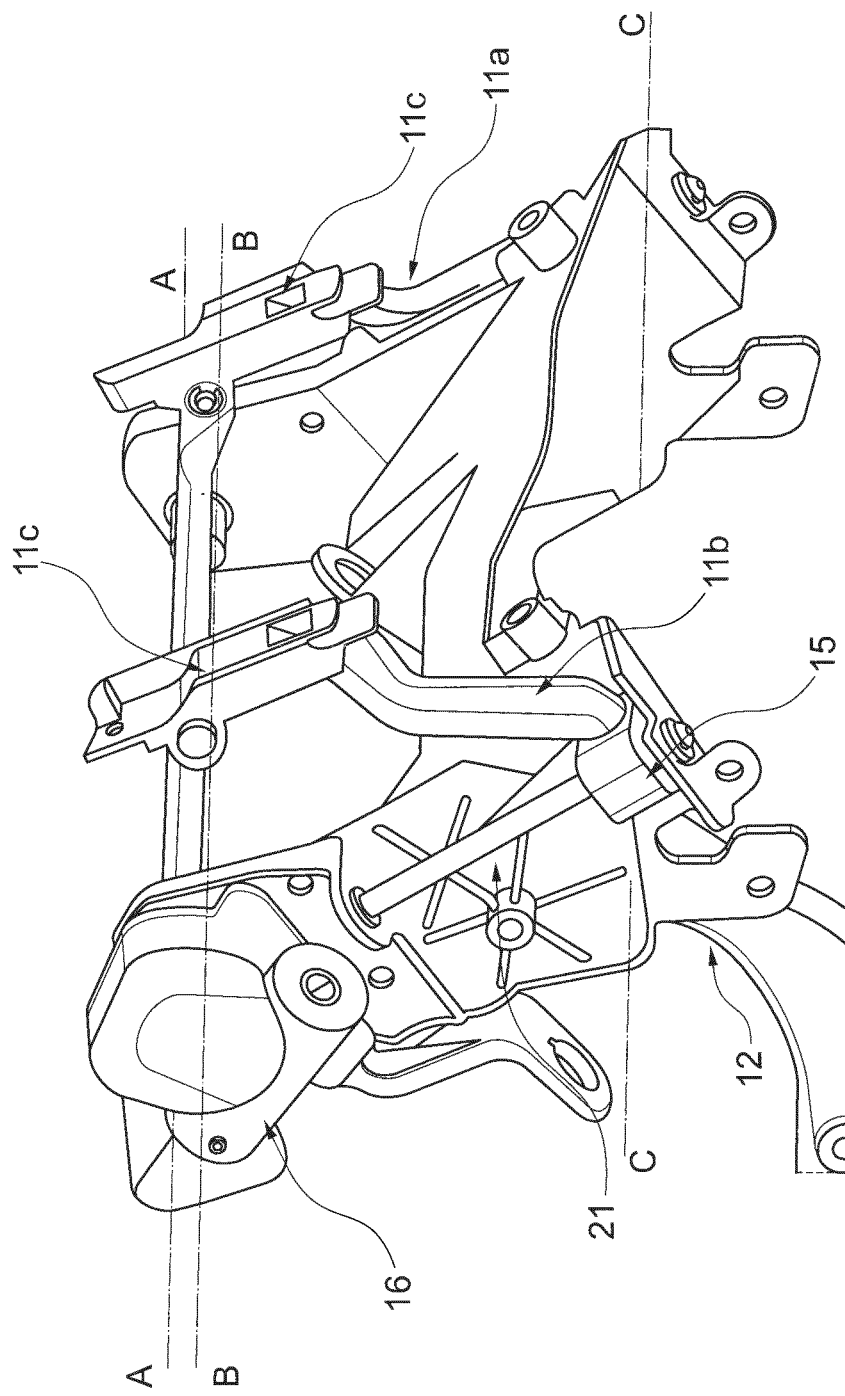
FIG. 3 is a third perspective view of the adjustment device according to FIG. 1.

FIGS. 1, 2 and 3 are different perspective views of an adjustment device 10 for adjusting a windscreen of a vehicle (not shown), particularly of a motorcycle. A windscreen holder is connectable with the windscreen (not shown), which windscreen holder is defined by two arm-shaped holding elements 11a, 11b. A carrier structure 12 is fastenable to a vehicle. A slider crank 13 is pivotable about a first pivot axis A connected with the carrier structure and is pivotable about a second pivot axis B connected with the two holding elements 11a, 11b of the windscreen holder. A linear guide 14 is provided, wherein the two holding elements 11a, 11b of the windscreen holder are linearly movably guided by way of a pivot bearing arrangement 15 in a longitudinal direction by the linear guide 14 and can be pivoted about a third pivot axis C. The pivot axes A, B, C are oriented parallel to one another as well as, in the illustrated embodiment, essentially horizontal and in the transverse direction with respect to a longitudinal direction of the vehicle (in the installed condition).

The adjustment device 10 additionally includes a rotary drive 16 for the pivoting of the slider crank 13 about at least the first pivot axis A.

Figure 4:
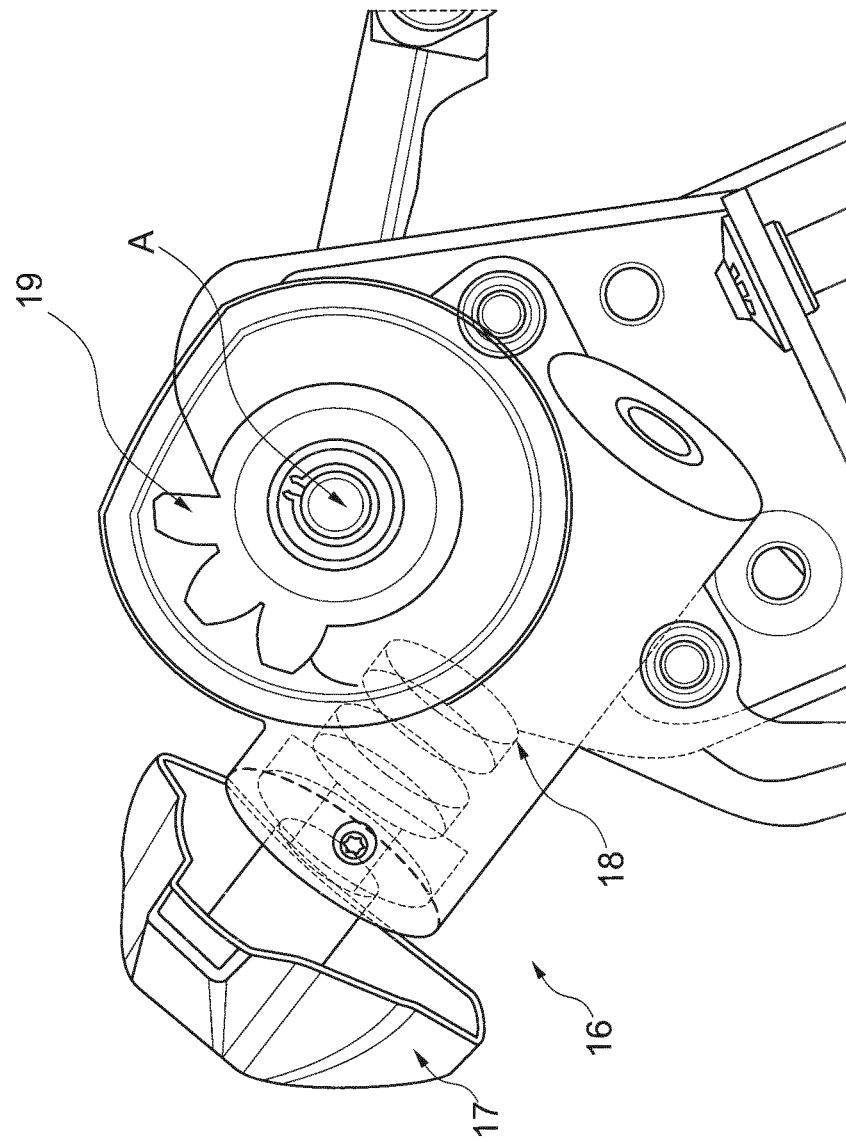
FIG. 4 is a view of a detail of a rotary drive of the adjustment device according to FIG. 1.

As illustrated particularly in FIG. 4, for this purpose, the rotary drive 16 includes a drive unit 17, a worm drive 18 rotatably coupled with the drive unit 17 and a gearwheel 19 which engages in the worm drive 18 and is non-rotatably coupled with the slider crank 13. The drive unit 17 is preferably implemented as a manually operable handwheel for the manual providing of the rotating movement of the drive unit 17. This further development of the rotary drive 16 has the advantage of a self-locking, so that the windscreen cannot be moved into a position other than the adjusted position and can therefore be adjusted and fixed in any intermediate position in a continuous manner.

Furthermore, the linear guide 14 according to FIGS. 1, 2 and 3 includes two guide rails 21 essentially oriented in the longitudinal direction of the vehicle, which are additionally tilted with respect to a horizontal plane. A respective tilt angle depends particularly on the vehicle type. Each holding element 11a, 11b of the windscreen holder, by way of a sliding block 20 of the pivot bearing arrangement 15, is linearly movably coupled with one of the two guide rails in a linearly movable and pivotable manner.

Additionally, each holding element 11a, 11b has a connecting section 11c for the connection with the windscreen. Only as an example, the respective connecting section 11c may be a flat contact surface for the windscreen as well as recesses for receiving fastening devices for the windscreen.

Furthermore, each holding element 11a, 11b has a first end and an opposite second end. One of the sliding blocks 20, respectively, of the pivot bearing arrangement 15 is arranged at the first end. In the area of the second end, the holding elements 11a, 11b are constructed for the pivotable connecting with the slider crank 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustment device for adjusting a windscreen of a vehicle, comprising:
    a windscreen holder which is connectable to the windscreen;
    a carrier structure which is fastenable to the vehicle;
    a slider crank, wherein the slider crank is pivotable about a first pivot axis connected with the carrier structure and pivotable about a second pivot axis connected with the windscreen holder; and
    a linear guide, wherein
        the windscreen holder is guided by a pivot bearing arrangement that is linearly movable in a longitudinal direction of the linear guide and the windscreen holder is pivotable about a third pivot axis, the first, second and third pivot axes being oriented parallel to one another.

2. The adjustment device according to claim 1, further comprising:
    a rotary drive configured to pivot the slider crank about at least the first and/or the second pivot axis.

3. The adjustment device according to claim 2, wherein:
    the rotary drive comprises at least one drive unit, a worm drive rotatably coupled with the drive unit and a gearwheel engaging in the worm drive and being non-rotatably coupled with the slider crank.

4. The adjustment device according to claim 3, wherein:
    the drive unit is a manually operable handwheel for manually providing rotating movement of the drive unit.

5. The adjustment device according to claim 4, wherein:
    the linear guide comprises at least two guide rails oriented essentially in a longitudinal direction of the vehicle, and
    the windscreen holder with one sliding block respectively of the pivot bearing arrangement is linearly movably coupled with one of the at least two guide rails.

6. The adjustment device according to claim 5, wherein:
    the windscreen holder comprises two arm-shaped holding elements, each holding element comprising a first end and a second end,
    one of the sliding blocks of the pivot bearing arrangement is arranged at the first end, and
    the respective holding element is constructed in the area of the second end for the pivotable connection with the slider crank.

7. The adjustment device according to claim 1, wherein:
    the linear guide comprises at least two guide rails oriented essentially in a longitudinal direction of the vehicle, and
    the windscreen holder with one sliding block respectively of the pivot bearing arrangement is linearly movably coupled with one of the at least two guide rails.

8. The adjustment device according to claim 1, wherein:
    the windscreen holder comprises two arm-shaped holding elements, each holding element comprising a first end and a second end,
    one of the sliding blocks of the pivot bearing arrangement is arranged at the first end, and
    the respective holding element is constructed in the area of the second end for the pivotable connection with the slider crank.

9. The adjustment device according to claim 1, wherein the adjustment device is configured to adjust the windscreen of a motorcycle.

10. A windscreen arrangement for a vehicle, comprising:
    a windscreen;
    an adjustment device configured to adjust the windscreen, the adjustment device comprising:
    a windscreen holder which is connected to the windscreen;
    a carrier structure which is fastenable to the vehicle;
    a slider crank, wherein the slider crank is pivotable about a first pivot axis connected with the carrier structure and pivotable about a second pivot axis connected with the windscreen holder; and
    a linear guide, wherein
        the windscreen holder is guided by a pivot bearing arrangement that is linearly movable in a longitudinal direction of the linear guide and the windscreen holder is pivotable about a third pivot axis, the first, second and third pivot axes being oriented parallel to one another, and
        the windscreen holder is connected with the windscreen to adjust a height and an inclination of the windscreen.

11. The windscreen arrangement according to claim 10, further comprising:
    a rotary drive configured to pivot the slider crank about at least the first and/or the second pivot axis.

12. The windscreen arrangement according to claim 11, wherein:
    the rotary drive comprises at least one drive unit, a worm drive rotatably coupled with the drive unit and a gearwheel engaging in the worm drive and being non-rotatably coupled with the slider crank.

13. The windscreen arrangement according to claim 12, wherein:
    the drive unit is a manually operable handwheel for manually providing rotating movement of the drive unit.

14. The windscreen arrangement according to claim 10, wherein:
    the linear guide comprises at least two guide rails oriented essentially in a longitudinal direction of the vehicle, and
    the windscreen holder with one sliding block respectively of the pivot bearing arrangement is linearly movably coupled with one of the at least two guide rails.

15. The windscreen arrangement according to claim 10, wherein:
    the windscreen holder comprises two arm-shaped holding elements, each holding element comprising a first end and a second end,
    one of the sliding blocks of the pivot bearing arrangement is arranged at the first end, and
    the respective holding element is constructed in the area of the second end for the pivotable connection with the slider crank.

16. The windscreen arrangement according to claim 10, wherein the windscreen arrangement is a motorcycle windscreen arrangement.

17. A vehicle, comprising:

a windscreen;

an adjustment device configured to adjust the windscreen, the adjustment device comprising:

a windscreen holder which is connected to the windscreen;

a carrier structure which is fastened to the vehicle;

a slider crank, wherein the slider crank is pivotable about a first pivot axis connected with the carrier structure and pivotable about a second pivot axis connected with the windscreen holder; and a linear guide, wherein the windscreen holder is guided by a pivot bearing arrangement that is linearly movable in a longitudinal direction of the linear guide and the windscreen holder is pivotable about a third pivot axis, the first, second and third pivot axes being oriented parallel to one another, and the windscreen holder is connected with the windscreen to adjust a height and an inclination of the windscreen.

18. The vehicle according to claim 17, wherein the vehicle is a motorcycle.

\* \* \* \* \*